Nov. 26, 1968     A. C. BROOKS     3,412,827

PISTON ROD ACTUATED INTERNAL METERING FLOW CONTROL MECHANISM

Filed Nov. 30, 1964

INVENTOR.
ALAN C. BROOKS

BY *Lauren I. Lerner*

ATTORNEY

United States Patent Office 3,412,827
Patented Nov. 26, 1968

3,412,827
PISTON ROD ACTUATED INTERNAL METERING
FLOW CONTROL MECHANISM
Alan C. Brooks, New York, N.Y.
(Box 747, Union, N.J. 07083)
Filed Nov. 30, 1964, Ser. No. 414,917
8 Claims. (Cl. 188—96)

ABSTRACT OF THE DISCLOSURE

This invention pertains to an arrangement of commonly used mechanical parts in a closed cylinder containing a piston rod attached to a piston and substantially filled with fluid in such a manner as to permit displacement of fluid from one side of the piston to the other internally when the piston is moved in either direction by the piston rod. Further, this arrangement utilizes the piston rod to function as a means of infinitely varying the flow rate and to actuate a poppet valve mechanism housed within the piston permanently so that when the rod moves linearly in one direction the valve is closed causing fluid flow to be metered through the piston and when the rod moves in the opposite direction the valve opens allowing free flow through the piston and rapid return of the poppet and piston metering mechanism.

---

This arrangement constitutes what is known to those versed in the art as an hydraulic control cylinder, commonly used to regulate the rate of linear travel of air operated reciprocating devices by attachment to the device in various ways.

The novel and radically different features of this arrangement is that extensive investigation of the art reveals that all other commercially available hydraulic control cylinders have external means for displacing and regulating fluid flow from one side of the piston to the other and all utilize an auxiliary cylinder as a fluid expansion chamber and to store fluid for replenishment purposes. Special injection guns and air bleeding devices are required and furnished by the manufacturers for filling these devices with fluid.

Figure 1:
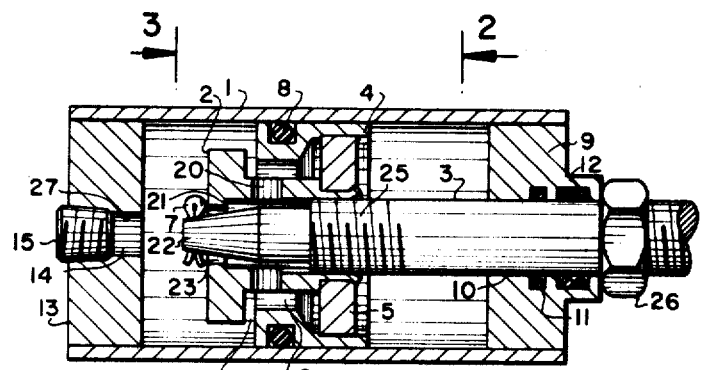
Figure 2:
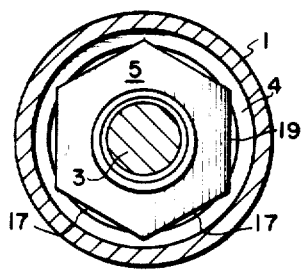
Figure 3:
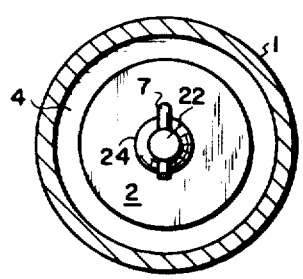
Figure 4:
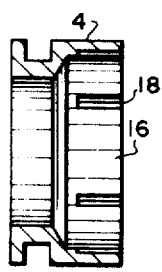
Figure 5:

In my novel arrangement, no by-pass tubes, fittings, needle valves, air bleeding devices or expansion chambers are used. A prime consideration of this novel arrangement is the complete elimination of these external accessories as being unnecessary with the result that this design improvement has exceptionally few parts permitting great reductions in manufacturing cost and subsequent maintenance as shall be seen from the accompanying drawing and the following description:

FIGURE 1 is an axial section through the device.
FIGURE 2 is a section across the device in FIGURE 1 looking in the direction of arrows 2—2.
FIGURE 3 is a section across the device in FIGURE 1 looking in the direction of arrows 3—3.
FIGURE 4 is an axial section of the piston shown in FIGURE 1.
FIGURE 5 is a view of the metering rod shown in FIGURE 1.

As shown in FIGURE 1, the cylinder 1 contains a metering poppet 2 and a metering piston rod 3, having screw threads 25, assembled to poppet 2 by mating screw threads. Rod 3 is free to rotate on its axis by actuation externally during engagement with the female threaded portion of poppet 2. Poppet 2 is assembled to piston 4 and prevented from radial motion by retaining plate 5 although free to move axially within piston 4 sufficient to open or close annular orifice 6 which permits fluid passage through openings 19 in either direction. A cotter pin 7 prevents unscrewing rod 3 from poppet 2 unintentionally. A pressure seal 8 contained in a groove in piston 4 prevents fluid passage from one side of the piston to the other except through channels provided for that purpose.

Rod end cylinder cap 9 has a bearing surface 10 to act as a guide for rod 3 and is under continuous lubrication from the fluid in the rod side of piston 4. A pressure seal 11 installed in a groove in bearing surface 10 prevents loss of fluid past rod 3 and one or more pressure seals 12 spaced apart from seal 11 prevents entry of foreign matter and air from the outside. A nut 26 is attached to rod 3 to prevent overtravel on the return stroke.

Blind end cylinder cap 13 has a threaded hole 14 to permit pouring fluid through it into cylinder 1 and a mating threaded plug 15 to seal off this opening when the cylinder has been substantially filled with fluid.

FIGURE 2 shows retaining plate 5 housed in slots 18 which are part of the periphery of hole 16 in piston 4, creating a number of openings 19 between the sides 17 of the retaining plate 5 and hole 16 through which fluid can flow in either direction.

Radial movement of plate 5 is prevented by being housed in slots 18 in piston 4 which piston is prevented from turning on its axis by the cross sectional squeeze of the highly frictional qualities of the pressure seal 8. Similarly, rod 3 is prevented from rotation about its axis by the cross sectional squeeze of seals 11 and 12, except when intentionally rotated externally.

When cylinder 1 is properly anchored, outward movement linearly of rod 3 extending through cap 9 will cause poppet 2 assembled to plate 5 to move with rod 3, closing annular opening 6 on piston 4 and carrying the piston in the direction of the rod movement. Fluid is then restricted to passage from the rod side of piston 4 through openings 19 into annular region 6 from where it is channeled through orifice 20 into annular orifice 21. At this point flow is metered into the opposite side of piston 4 by the interaction of cone 22 which is an integral part of rod 3 with hole 23 in poppet 2. The diameter of the base of the cone 22 is a close precision fit with the diameter of hole 23, permitting entry of cone 22 into hole 23 to effect a complete stopping of flow if desired. Threaded sections of poppet 2 and rod 3 permit gradual advance and retraction of cone 22 in hole 23 when rod 3 is rotated in engagement with the threaded portion of poppet 2 externally.

This arrangement allows infinitely varying the cross sectional area of the annular opening 24 in FIG. 3 between cone 22 and hole 23, resulting in a means for infinitely adjusting flow regulation internally, and without by-pass tubes or needle valves externally.

Linear movement of rod 3 in the opposite direction will cause poppet 2 to move with it until plate 5 assembled to poppet 2 strikes the bottom of slots 18 causing piston 4 to move with poppet 2 and plate 5 as a unit. During this period of reverse linear motion, flow through piston 4 is unrestricted since poppet 2 has opened a relatively large gap 28 between poppet 2 and piston 4, allowing fluid to flow freely back into the rod side of piston 4 through the large annular opening 6 connecting with openings 19.

This basic concept is specifically stated to be any means or device within a closed cylinder sealed against leakage on both ends which allows internally regulating the rate of fluid flow from one side of the piston to the other when the piston rod moves linearly in one direction and permits free flow rapid return when the rod movement linearly is reversed. This basic concept also includes the use of a piston rod as an internal means of infinitely adjusting the flow rate when desired while constantly serving as the actuator for the valve mechanism housed in the piston, and specifically excluding the use of by-pass tubes or needle valves externally.

Extensive tests of several design variations of this disclosure have been conducted by the inventor with equal success. The construction shown in the drawing and described above has been found by test to be the optimum design.

The tests referred to conclusively prove that an air space 27 of approximately one tenth of a cubic inch in hole 14 between the top of the fluid and fill plug 15 is all that is needed to allow for possible thermal expansion of the fluid in the cylinder during operation, completely eliminating the need for expansion and fluid replenishment auxiliary chambers. In this completely self contained sealed cylinder arrangement, leakage can only occur when seals 11 and 12 have worn sufficiently to permit fluid under pressure created by the forward movement of the piston rod 4 to by-pass to the outside of the cylinder.

During operation the relatively small volume of air in space 27 is mixed with the fluid in the cylinder in the form of minute finely dispersed bubbles which are compressed into infinity when a load is applied to the rod side of the piston 4 by the forward movement of rod 3, allowing the mixture to function as a solid in liquid form. Operation of the cylinder is thus made possible in any position through 360° of a circle. This has been determined by observation of the compressed mixture through a transparent cylinder and by extensive use tests.

In a completely closed cylinder sealed against leakage on both ends, having within it a movable piston connected to a piston rod and substantially filled with fluid, I claim as novel the following:

1. A flow control device comprising a closed cylinder, a piston having a passageway therethrough, a piston rod, a poppet valve formed on said piston rod and positioned at least partially within said piston passageway, said poppet valve having a fluid metering passageway therethrough, said poppet valve being operated when said piston rod is moved in one axial direction within said cylinder to close said piston passageway and to allow fluid to pass from one side of said piston to the other side thereof only through said fluid metering passageway, said poppet valve being operative when said piston rod is moved in an axial direction opposite to said one axial direction to allow fluid to pass through said piston passageway from said other side of the piston, said poppet valve fluid metering passageway being an annular passageway, said piston rod being adjustable to vary the area of said annular passageway to control the flow of fluid through said fluid metering passageway.

2. The fluid control device of claim 1 wherein said cylinder has a first end cap with a hole therethrough, a plug for said first end cap hole, said cylinder being filled through said one end cap hole, said plug extending only partially into said hole to leave an air space to allow for thermal expansion of said liquid during operation of said fluid control device.

3. The flow control device of claim 1 wherein said piston rod has a conical member at the end thereof, restraining means for restraining said poppet valve from rotational movement relative to said piston rod, means for rotating said piston rod to move said conical member into and out of said annular passageway to effect changes in the areas of said annular passage.

4. The fluid control device of claim 3 wherein said piston rod is screw threaded into engagement with said poppet valve, said screw threaded engagement being operative to achieve axial movement of said conical portion relative to said poppet valve annular passageway.

5. The fluid control device of claim 3 including piston restraining means, said piston restraining means being operative to prevent rotation of said piston relative to said cylinder.

6. The fluid control device of claim 5 wherein said piston restraining means is a pressure seal formed on the outer surface of the piston and positively engaging the inner surface of the cylinder.

7. The fluid control device of claim 1 wherein said cylinder has an end cap at an end thereof, said piston rod extending through said end cap to allow said piston to be actuated from a point outside of said cylinder.

8. The fluid control device of claim 7 wherein said piston rod has a stop thereon to limit the axial movement of said piston rod, said end cap having pressure seals thereon engaging the surface of said piston rod to prevent leakage of fluid from within said cylinder and to prevent leakage into said cylinder.

References Cited

UNITED STATES PATENTS

| 2,410,992 | 11/1946 | Myklestad | 188—88 |
| 2,342,729 | 2/1944 | Focht | 188—88 |
| 2,774,447 | 12/1956 | De Carbon | 188—88 |
| 2,930,070 | 3/1960 | Uebelhoer | 188—88 |
| 2,950,785 | 8/1960 | Patriguin | 188—88 |
| 3,070,191 | 12/1962 | Allinguant | 188—88 |

FOREIGN PATENTS

| 1,006,219 | 4/1957 | Germany. |

GEORGE E. A. HALVOSA, *Primary Examiner.*